Oct. 21, 1941.  E. R. HATHAWAY  2,260,115
RETAINER STRIP
Filed March 6, 1939  2 Sheets-Sheet 2
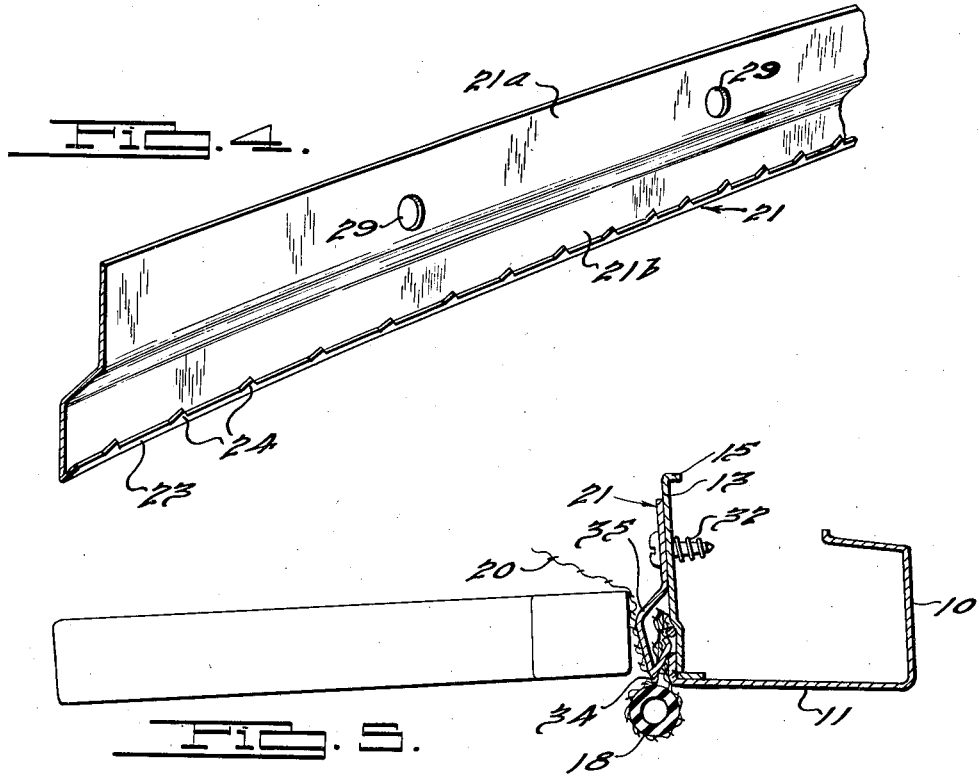
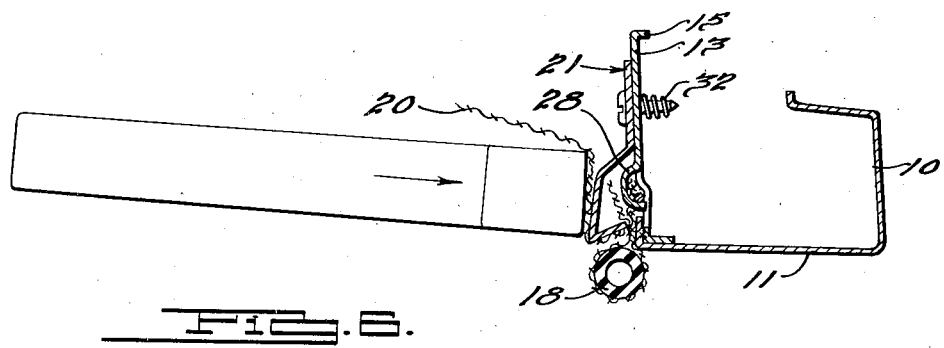
INVENTOR
Edward R. Hathaway.
BY
Dike Calver and Gray ATTORNEYS.

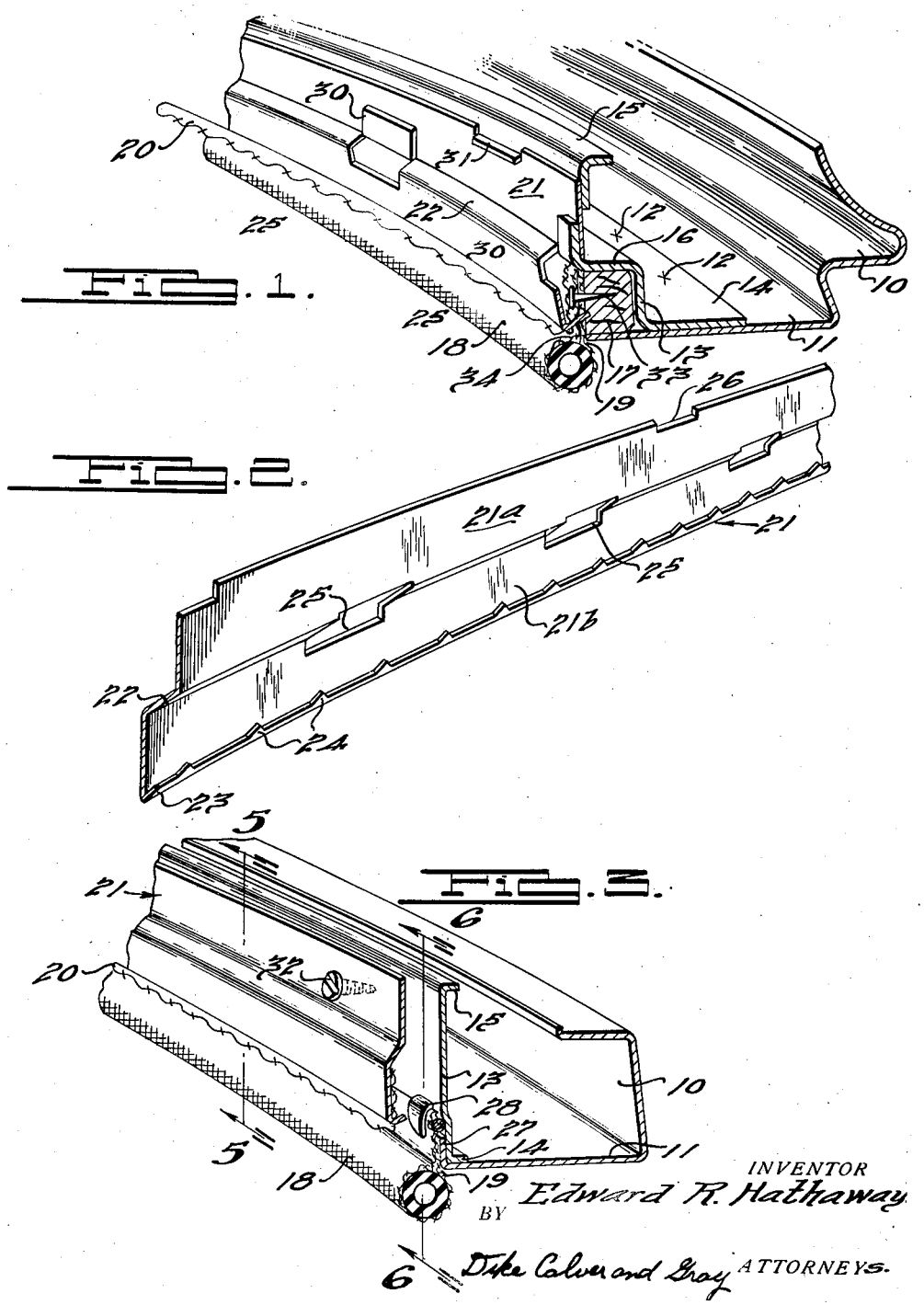

Patented Oct. 21, 1941

2,260,115

UNITED STATES PATENT OFFICE 2,260,115

RETAINER STRIP

Edward R. Hathaway, Detroit, Mich., assignor to Briggs Manufacturing Company, Detroit, Mich., a corporation of Michigan Application March 6, 1939, Serial No. 260,070

3 Claims. (Cl. 296—135)

The present invention relates to improvements in retaining means for fabric materials employed for the purpose of trimming or upholstering vehicle bodies or the like, the invention being particularly applicable to the attachment of headlinings in automobile bodies.

One object of the invention is to provide improved fastening or retaining means for the headlining or other fabric trim portions of a vehicle or automobile body by the use of which the headlining may be readily and easily installed and effectively secured in position and whereby the retainer or fastening devices are wholly concealed from view.

Another object of the invention is to provide a concealed retainer strip or equivalent means for securing the headlining in the roof of a vehicle and so constructed and arranged as to permit attachment of the headlining in its proper location without the use of tacks or the like.

A further object is to provide a metallic headlining retainer of the foregoing character which is deformable and which is adapted to hold the material in place by a piercing thereof at given points as well as to effect a gripping action on said material.

The present application is a continuation in part of my application Serial No. 41,360, filed September 20, 1935.

Other objects of this invention will appear in the following description and appended claims, reference being had to the accompanying drawings forming a part of this specification wherein like reference characters designate corresponding parts in the several views.

Fig. 1 is a fragmentary perspective view of a section of an automobile body in the locality of the side roof rail and illustrating one form of attaching means for the headlining, with the parts shown in the finally assembled position.

Fig. 2 is a perspective view, in section, illustrating one retainer strip made in accordance with the present invention.

Fig. 3 is a view generally similar to Fig. 1 but illustrating another form of attaching means for the headlining.

Fig. 4 is a view generally similar to Fig. 2 but illustrating a slightly modified form of retainer strip.

Fig. 5 is a transverse section through the side roof rail of the form of the invention depicted in Fig. 3 and is taken along the lines 5—5 of Fig. 3 in the direction of the arrows. This view shows the parts in a finally assembled condition as well as indicating the means used for so assembling them.

Fig. 6 is a view similar to Fig. 5 but is taken along the lines 6—6 of Fig. 3 and shows the parts in a partially assembled condition.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In Figs. 1 and 2 there is illustrated, by way of example, one embodiment of the invention whereby the headlining of an automobile body may be readily and conveniently attached along its edges while at the same time fully concealing the attaching means therefor. The numaral 10 (Fig. 1) represents an outside roof panel having an inwardly projecting flanging 11, which flanging may constitute, for instance, the upper header or jamb of the door opening of a vehicle body or may extend into the interior of the vehicle for the sole purpose of supporting the side roof rail 13 which is fixed thereto by suitable means, such as spot welding as indicated at 12, 12. This side roof rail is a substantially flat upstanding metallic strip having a lower outwardly extending longitudinal, horizontal flanging 14 superimposed upon the flanging 11 of the panel 10, which flanging 14 is fixed thereto in the above mentioned manner. The rail 13 also possesses an upper outwardly extending longitudinal flange 15 and an outwardly extending offset portion as shown at 16 (Fig. 1) to provide, longitudinally of the side rail, a recess or channel within which a tacking strip 17 is situated.

Extending along the inner edge of the flanging 11 is a windlace 18 which may be of any suitable type. In the present instance the windlace comprises a core of rubber tubing covered by a fabric material, which material continues to form a projecting lip 19 utilized as a hanger for the windlace.

The headlining or fabric trim material for covering the inner side of the roof of the vehicle is indicated at 20. In accordance with the present invention the marginal edges of the headlining are attached in place by means of a metallic retainer strip indicated generally by the reference numeral 21. This retainer strip may be formed from a flat strip of deformable metallic stock and in the form of the invention under discussion said strip, for example, may be stamped intermediate its upper and lower edges to form an offset portion 22 thereby providing an upper flat wall 21a and a lower longitudinal flat wall 21b, which walls normally extend in substantially parallel planes. The lower edge of the wall 21b is formed with a laterally directed flange 23 having a series of spaced teeth or prongs 24, 24 cut therefrom. The flange 23 and the teeth 24, 24 are preferably directed outwardly and at an upward slant with respect to the plane of the wall 21b, and the prongs 24, 24 are spaced apart a distance materially greater than the base width thereof to permit the prongs to pierce the headlining material. A series of slots or openings 25, 25 may be punched in the offset portion 22 of the strip 21. In addition, the upper edge of the wall 21a of the strip 21 may be provided with a suitable number of notches 26.

In Figs. 3 to 6 inclusive, there is illustrated another embodiment of the present invention. In this embodiment the flanging 11 of the outside roof panel 10 terminates in an upstanding longitudinally extending flange 27 (Fig. 3). The inner side roof rail 13 is seated behind the flanging 27 and is attached thereto and to the flanging 11 by suitable means such as spot welding. In the present embodiment the side rail 13 is not provided with an offset portion, but is provided with a series of inwardly extending punched out ears 28 as best shown in Fig. 3.

In the present form of the invention the retainer strip 21 is practically identical in structure with the retainer strip of the form of the invention above described. However, it will be noted that the present retainer strip possesses no punched out portions 25 or notches 27, and in lieu thereof is provided with a series of apertures or screw holes 29, 29 in the surface of the upper wall 21a as shown in Fig. 4. The structure of the headlining 20 and windlace 18 is, in the present form of the invention, the same as that described above with the exception that the lip 19 of the windlace 18 terminates in an enlarged, rounded, longitudinally extending edge portion preferably formed by enclosing the edge of the lip about a small cord or the like as clearly illustrated in Fig. 3.

The assembly of the retainer strip relative to the side rail is as follows: In the form of the invention depicted in Figs. 1 and 2, the upper wall 21a of the retainer strip 21 is placed in juxtaposed relation to the inner face of the roof rail 15. Tongues 30 (Fig. 1) are punched from a metal of the side rail 13 at positions suitable to register with the openings 25. These tongues normally project inwardly preparatory to the assembly and attachment of the retainer strip to the rail, and are inclined slightly upwardly. When mounting the retainer strip on the rail, the inwardly inclined tongues 30 project through the openings 25 in the retainer strip and the strip is suspended thereupon. The tongues 30 are then bent upwardly into engagement with the inner face of the wall 21a as illustrated in Fig. 1 so as to clamp the strip in position against the roof rail. Additional locking means is provided to prevent upward displacement of the strip and comprises tongues 31 pressed from the metal of the side rail 13, which tongues are positioned to register with the notches 26 in the retainer strip 21 and which fit thereinto along the upper edge of the strip as also shown in Fig. 1.

In the form of the invention shown in Figs. 3 to 6 inclusive, the retainer strip 21 is mounted on the side rail 13 by means of the fastening elements or screws 32. These screws are inserted through the apertures 29 in the side wall 21a and are threaded into suitable openings provided in the side rail 13, which openings are positioned to register with the said apertures 29.

The assembly of the headlining material into its retained position is as follows: In the form of the invention depicted in Figs. 1 and 2, the lip 19 of the windlace 18 is first inserted between the teeth 24 of the strip 21 and the tacking strip 17. This lip is then fastened to the tacking strip by means of the tacks 33 (Fig. 1). However, the tacks 33 operate as temporary retaining means only for the windlace 18, which is permanently retained in position in the manner indicated hereinafter. The edge of the headlining material 20 is then forced upwardly between the flange 23 and the inner surface of the windlace lip 19. At this point the headlining material may, if desired, be caught upon the teeth 24 and thus temporarily retained between the retainer strip 21 and the tacking strip 17 for purposes of holding it in place during the assembling operation. As shown, the headlining 20 now extends downwardly around the flange 23 and about the lower edge of the retaining strip thereby concealing the latter. The free edge of the headlining 20 is concealed between the wall 21b and the tacking strip 17. After partial assembly of the headlining in the above indicated manner, the wall 21b may be hammered outwardly in the direction of the tacking strip 17 so as to drive the sharp teeth or prongs 24 through the headlining 20 and through the lip 19 of the windlace 18. A hammer or other suitable driving tool may be used for this purpose and the blows used in driving the prongs through these materials mentioned are directed through the headlining 20 against the inner face of the wall 21b. The prongs 24, after having pierced the headlining material and lip of the windlace, contact the tacking strip 17 and become embedded therewithin while at the same time being deformed or bent upwards to some extent. However, due to the upward slant of the flange 23 and of the prongs 24 attached thereto, these parts are bent inwardly, that is, in the direction of the wall 21b when the retainer strip is struck and deformed in the manner above described. This inward bending of the prongs 24 and flange 23 serves to squeeze or clamp the headlining 20 and the lip 19 between the inner face of these parts and the outer face of the wall 21b and, therefore, to further retain the headlining material and windlace in position. It will be noted that the retainer strip 21 will bend at the point of juncture of the flange 23 and wall 21b as indicated at 34 (Fig. 1) thereby to provide a narrowing of the opening between the wall 21b and the flange 23 at this particular point and thus to facilitate the aforesaid clamping action.

In the form of the invention depicted in Figs. 3 to 6 inclusive, the assembly of the headlining material is similar to that described above, except in the following particulars: The enlarged edge of the lip 19 is first inserted between the inwardly extending ears 28 and the face of the side rail 13 and is squeezed therebetween. This operation temporarily retains the windlace 18 in place during the assembly operations. The teeth 24 pierce the headlining 20 and lip 19 in the manner described above. The position of the parts of the present form of the invention just prior to this operation is shown in Fig. 6. The retainer strip 21 is then struck as described previously and is deformed in the manner shown in Fig. 5 being bent in particular at the points indicated by the numerals 34 and 35 (Fig. 5), while the flange 23 and teeth 24 are bent toward the rail 13 and grip the headlining 20 in the way previously mentioned. However, since no tacking strip 17 is provided in the present form of the invention, it will be noted that the teeth 24 after piercing the headlining 20 and lip 19 are driven into contact with the outer face of the metallic side rail 13 as particularly shown in Fig. 5. Since the teeth 24 contact the said rail as a result of a driving operation they are further bent in the direction of the side wall 21b, see Fig. 5. This bending of the teeth 24 serves to cause a gripping of the headlining 20 and lip 19 in the manner already described, except that such gripping effect is accentuated due to a more marked bending of the flange 23 and teeth 24 resultant from a driving contact with the metallic surface instead of a wood surface as in the form of the invention already described.

From the foregoing it will be seen that the present invention provides a very simple and efficient means for attaching the marginal edges of the headlining to the side roof rail or other framing or supporting portion of the vehicle body so as to produce a wholly concealed connection. The retainer strip 21 may be easily and readily installed on the side rail or within the body along the upper and rear sides thereof. Although two suitable methods for attaching the said strip to the said rail have been described, it will be understood that such methods are shown herein simply for illustrative purposes and that other suitable means may be employed. In the present invention the construction of the retainer strip is such that the lower wall portion thereof is provided with laterally projecting teeth or prongs so arranged that the edge of the headlining may be tucked or forced up into the space between the retainer strip and the rail or other body part and held by means of the said teeth. Moreover, these teeth are so arranged relative to the strip that they will first impale the headlining and thereafter, by virtue of the relatively soft, untempered and deformable character of the metal, be bent in the direction of the inner wall of the retainer strip so as to effect a clamping or gripping action on the headlining material. Consequently, according to the present invention, the headlining is very firmly retained; for it is not only suspended upon prongs which pierce it but, in addition, it is firmly clamped or gripped.

I claim:

1. A headlining retainer for a vehicle body having a side roof rail, comprising an easily bendable metal strip having four angularly related substantially straight portions including an upper attaching portion adapted to be secured to the rail, an outwardly and downwardly inclined portion, an angularly related generally vertically extending portion, and an inwardly and upwardly extending flange portion provided along its longitudinal edge with widely spaced teeth, the included angle between said flange and vertically extending portion being less than a right angle to form a line along which the flange is easily bendable, and said strip being permanently bendable at the line of juncture between adjacent portions, whereby to move the vertical portion permanently in close proximity to the rail and to draw the material tightly around the lower edge of the retainer when the strip is driven inwardly by a blow from an implement to clamp the material to the rail.

2. A headlining retainer for a vehicle body having a side roof rail, comprising an easily bendable metal strip having four angularly related portions including an upper attaching portion adapted to be secured to the rail, an outwardly and downwardly inclined portion, an angularly related generally vertically extending portion, and an inwardly and upwardly extending substantially straight flange portion provided along its longitudinal edge with widely spaced teeth, the included angle between said flange and vertically extending portion being less than a right angle to form a line along which the flange is easily bendable, and said strip being permanently bendable at the line of juncture between adjacent portions, whereby to move the vertical portion permanently in close proximity to the rail to tighten the material around the lower edge of the retainer when the strip is driven inwardly by a blow from an implement to clamp the material to the rail.

3. A headlining retainer for a vehicle body having a side roof rail, comprising an easily bendable metal strip having four angularly related portions including an upper attaching portion adapted to be secured to the rail and terminating in an outwardly and downwardly inclined portion, the latter terminating in a generally vertically extending portion, the latter terminating in an inwardly and upwardly extending substantially straight flange provided along its longitudinal edge with widely spaced teeth, the included angle between said flange and vertically extending portion being less than a right angle to form a line along which the flange is easily bendable, said strip being permanently bendable along the line of juncture between at least two of said portions, when the strip is driven inwardly by the blow from an implement, thereby to displace the lower edge of the vertically extending portion materially closer to the rail, and said flange being permanently bendable upwardly along its line of juncture with the vertically extending portion to effect complete penetration of the teeth through the headlining material inserted between the strip and rail and to pinch or clamp the material in place.

EDWARD R. HATHAWAY.